Figure 4:
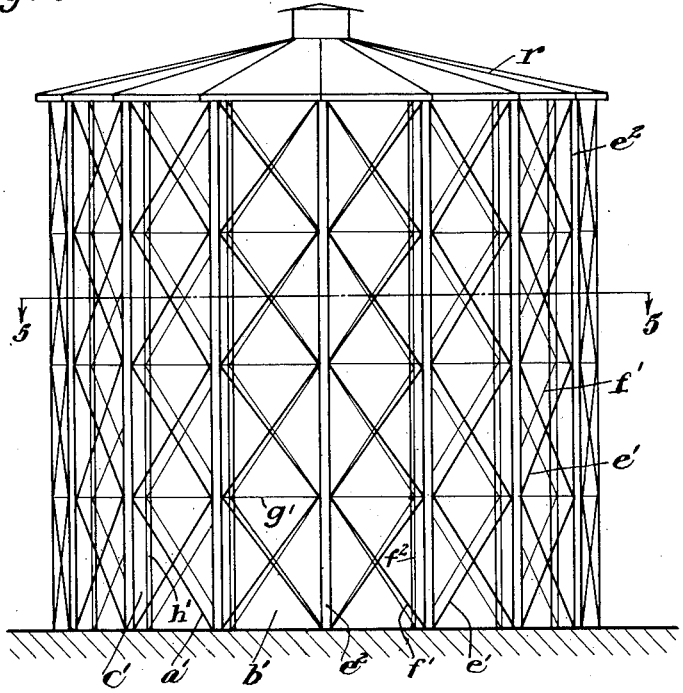

Aug. 22, 1933.     K. JAGSCHITZ     1,923,093
WATERLESS GAS HOLDER
Filed Dec. 19, 1928     2 Sheets-Sheet 1
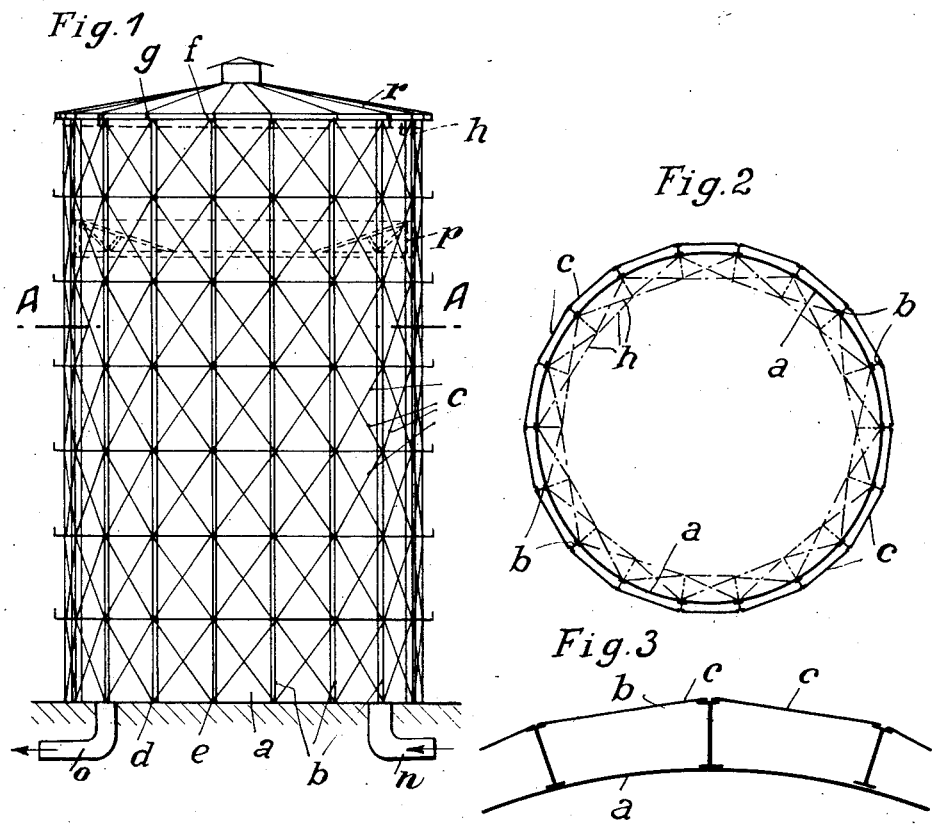
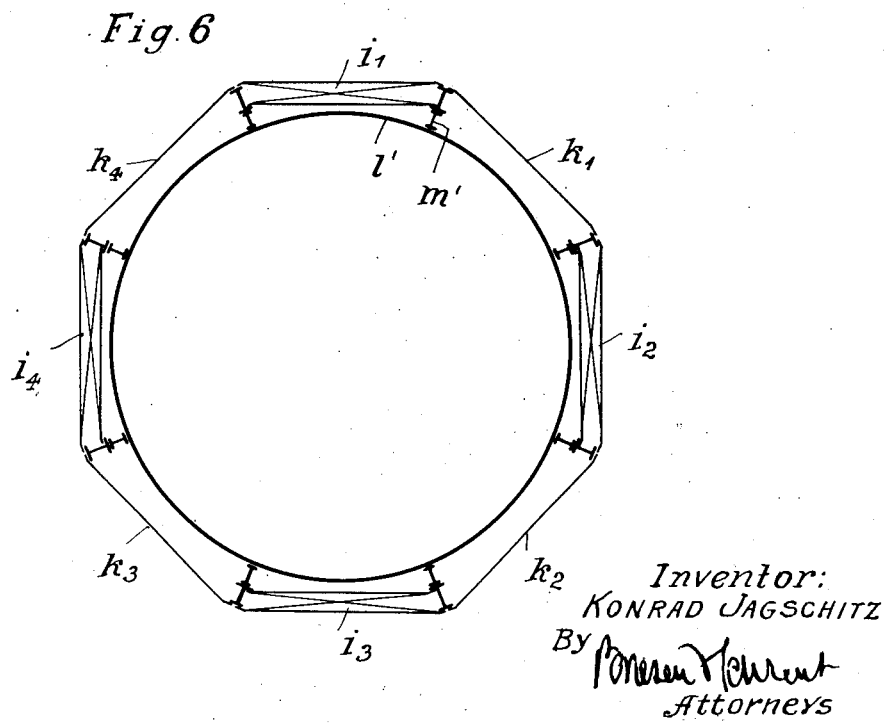
Inventor:
KONRAD JAGSCHITZ
By
Attorneys Aug. 22, 1933.  K. JAGSCHITZ  1,923,093
WATERLESS GAS HOLDER
Filed Dec. 19, 1928   2 Sheets-Sheet 2

Inventor:
KONRAD JAGSCHITZ
By
Attorneys

Patented Aug. 22, 1933

1,923,093

UNITED STATES PATENT OFFICE 1,923,093

WATERLESS GAS-HOLDER

Konrad Jagschitz, Mainz, Germany

Application December 19, 1928, Serial No. 327,041, and in Germany December 20, 1927

6 Claims. (Cl. 48—176)

This invention relates to gas-holders without water seals of the kind having a tank made of sheet metal and consists essentially in a novel frame-work structure for gas-holders of this kind.

Gas-holders which operate without water seals usually comprise a tank ordinarily of cylindrical conformation and reinforcements for said tank, said reinforcements consisting ordinarily of a plurality of vertical posts which are structurally united in some convenient way with said tank. In addition to these posts the use of ring-shaped reinforcing members which surround the wall of the tank has also been suggested. In special cases these ring-shaped reinforcing members are provided only near the upper and lower rims of the tank in order to serve as additional strengthening members for the structure. As so constructed the wall of the tank has to sustain not only the internal pressure of the gas but also the transverse forces which are exerted upon the structure from the outside, such as wind pressures or the like. The posts obviously will be able to withstand only strains which are imposed upon the gas-holder in vertical direction and in addition may also be used with or without supplementary devices as guide-members for the packing-disc.

In its preferred form the frame-work structure according to the present invention may be considered as consisting of a combination of the ordinarily used reinforcing elements, such as the aforementioned posts, which are united with the cylindrical wall of the tank, and further structural elements which consists of trusses interposed in a diagonal direction between the several pairs of posts at the exterior edges thereof. By so constructing the frame-work structure for the gas-holder each section intermediate two adjacent reinforcing posts will form an additional reinforcement for the frame-work structure of the gas-holder, said additional reinforcement resulting in an increased mechanical strength of the entire structure. These intermediate sections form, in effect, planar walls which produce, with the roof structure $r$, with which the gasometers of the type indicated are usually provided, spatial or solid angles whose constructions are characterized by great rigidity. The total strength of the reinforcing structure of the gas-holder is thus extraordinarily increased according to my invention by the addition of the aforementioned diagonal trusses, which results in great savings of structural material, as the gasometer shell can be made of much thinner plate than heretofore, and at the same time provides a maximum of rigidity and mechanical strength for the reinforcing structure.

According to my invention an especial advantage results from the combination of the aforementioned novel principle of reinforcement by diagonal trusses with the ring-shaped reinforcing member provided at the upper rim of the gas-holder, such as the ring-shaped reinforcing member described in the German Patent No. 396,629. The favorable properties of this reinforcing ring as a structural element could up to the present time not be properly utilized in circular gas-holders, as had been possible with gas-holders of polygonal form. A feature of my invention, therefore, consists in making the several sections of the reinforcing structure for the gas-holder in the form of rigid open frame-work sections, that is of frame-work elements or units which afford rigidity in all directions, the whole forming a reinforcing structure of polygonal form. This rigidity is due in large part to the formation of exceedingly strong structural elements in the form of solid angles whose walls are defined by the ring and by the pairs of converging adjacent reinforcing sections. This combination of reinforcing members will result in the advantage that the said reinforcing ring will be structurally utilized to far greater extent than has heretofore been possible, particularly with circular gas-holders. The aforementioned combination of structural elements according to my invention, therefore, will result in certain further advantages which could not be attained in known constructions. The aforementioned reinforcing ring—or other member of annular conformation—may be arranged interiorly or exteriorly of the reinforcing frame-work structure. It may further be noted that this reinforcing ring does not need to be arranged exactly at the upper rim of the tank, it being also possible to arrange this member at some distance from such rim, in order to utilize the structural properties of said ring to the greatest possible extent. This ring or stiffening member may also form part of the roof structure, or the slightly conical roof structure usually provided on waterless gas-holders itself may be regarded as the reinforcing ring, it being very nearly perpendicular to the vertical supporting posts. In each case, the ring forms solid angles with the reinforcing wall sections converging at such posts, thereby producing structures having extraordinary rigidity.

Figure 5:
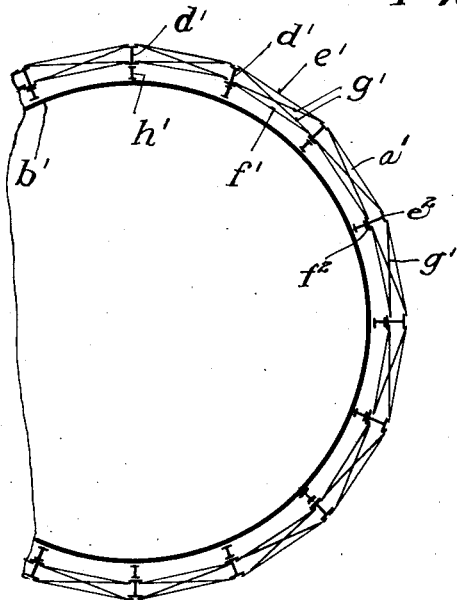
Figure 7:
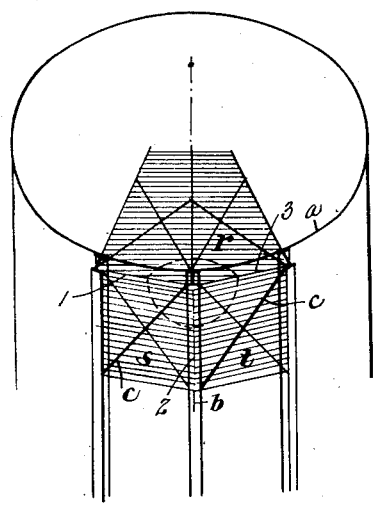

In the accompanying drawings I have represented a few examples of a construction according to my invention, Fig. 1 being a diagrammatical side view of a reinforcing structure for a gas-holder embodying one form of my invention, Fig. 2 a cross-section through Fig. 1 along the line A—A, Fig. 3 an enlarged portion of the cross-section shown in Fig. 2, Fig. 4 a diagrammatical side view of a modified reinforcing structure for a gas-holder, Fig. 5 an horizontal cross-section in part through Fig. 4, Fig. 6 an horizontal cross-section through another modified form of reinforcing structure, and Fig. 7 shows diagrammatically a detail of the reinforcing structure.

Referring now more particularly to the drawings the gas-holder as represented in Figs. 1, 2 and 3 comprises a shell or tank $a$ made of sheet-metal of circular cross-section, vertical reinforcing posts $b$ being arranged in known manner to serve as a vertical reinforcement for the wall of said tank. The gas-holder is provided with a gas inlet $n$, a gas outlet $o$ and a closure disc $p$ of any known or suitable construction. According to my invention there are provided as additional reinforcing elements diagonally directed trusses $c$ which are interposed intermediate each pair of adjacent posts $b$, said diagonal trusses consisting of flat iron-bars, angle-irons or the like. By providing these diagonal trusses $c$ intermediate each pair of adjacent posts $b$ around the wall of the tank $a$ there will be formed a plurality of frame-work sections, such as for instance the area $d$—$e$—$f$—$g$ intermediate each pair of adjacent posts $b$, said sections affording structural reinforcements extending in vertical direction all over the wall of the tank. The horizontal trusses as shown in Fig. 1 may be fixedly connected with the tank $a$, the same as the vertical posts $b$. It will readily be seen that this construction will essentially increase the mechanical strength and rigidity of the entire structure of the gas-holder.

In Figs. 1 and 2 there is further indicated by dash-and-dot lines the manner in which the known ring-shaped reinforcing element which consists of the trusses $h$ or the like may be combined with the aforedescribed construction according to my present invention. The framework in this case forms part of the roof-construction of the gas-holder—which roof-construction is not shown in detail in the drawing—and as above explained will essentially contribute to provide an effective additional reinforcement of the entire frame-work structure of the gas-holder.

The principle of the construction according to Figs. 1, 2 and 3 as above indicated according to my invention may also be combined with a further structural principle. This further structural principle resides in the feature that the wall of the tank $a$ is mechanically separated from the reinforcing frame-work structure as much as possible so that said tank will have to sustain only the pressure of the gas therein, while the reinforcing frame-work serves for withstanding all exterior forces, such as may be exerted by wind-pressure, by the weight of the frame-work or the like and will form a strong and rigid structure, which surrounds the cylindrical wall of the tank. By this mode of construction the wall of the tank will be fully released of all mechanical strains and the use of a wall of unusually small thickness will be made possible. Moreover, the frame-work structure according to my invention may be easily designed and erected, and in addition there will result great savings of structural material as compared with known reinforcing constructions for gas-holders.

The several sections of the reinforcing framework structure of the gas-holder may be so constructed as to consist of open frame-work elements or units of trapezoidal horizontal cross-section which are possessed of rigidity in all directions. It will also be possible to further simplify the reinforcing frame-work structure by constructing not all of said sections of the frame-work but only a part thereof in the manner just indicated. For instance, every second section may be constructed in the manner indicated, while the alternate sections may be provided with simple diagonally directed trusses or the like in order to transmit transverse forces from one section to the other.

According to Figs. 4, 5 and 6 the reinforcing frame-work structure $a$ and the wall $b'$ of the tank are made as separate parts constructionally independent of each other. The reinforcing frame-work structure according to Figs. 4 and 5 is of polygonal cross-section having sixteen frame-work sections and each of said sixteen sections represents a completely rigid frame-work element or unit, each being composed of two adjacent vertical posts $d'$, the outer and inner vertically inclined trusses $e'$ and $f'$ connecting, respectively, the outer edges $e^2$ and the inner edges $f^2$ of the posts, and the horizontal diagonal trusses $g'$, each section being thus constructed as a skeleton four-sided column of great strength and rigidity. As the posts, which provide two of the sides of each column, extend radially of the center of the gas-holder, the columns are trapezoidal in plan view, as shown clearly in Fig. 5. The wall $b'$ of the tank is fastened to the frame-work structure by means of bars or beams $h'$ as indicated in Fig. 5. The wall $b'$ of the tank may be of circular or of any other usual cross-section.

Fig. 6 shows a special construction of the reinforcing frame-work structure for the gas-holder. According to Fig. 6 the frame-work structure is of polygonal cross-section having eight sections of which only every second section is constructed as a fully rigid frame-work element, while the intermediate sections are provided with only outer vertically inclined diagonal trusses. The former fully rigid sections are designated with $i_1$, $i_2$, $i_3$, and $i_4$, while the latter sections are designated with $k_1$, $k_2$, $k_3$ and $k_4$. A construction of this kind, statically considered, will have the advantage of being of great mechanical strength and rigidity, at the same time requiring a minimum amount of structural material. The wall $l'$ of the tank according to the construction shown in Fig. 6 is also connected with the frame-work structure by means of bars or beams $m'$ in the form of I-beams, the same as in the construction shown in Fig. 5.

It will be noted that in each of the constructions shown in Figs. 1 and 4, the roof structure is attached to the reinforcing framework. As the diagonal trusses or braces form, in effect, planar walls between adjacent posts, there are formed at the upper ends of the latter spatial or solid angles bounded by such walls and the roof, whereby an extremely rigid structure is obtained. A similar result is obtained with horizontally extending reinforcing rings, whether such rings form part of the roof structure or not.

The solid angle construction is illustrated diagrammatically in Fig. 7 wherein $s$ and $t$ represent a pair of adjacent converging reinforcing sections and $r$ the roof, the parts being shaded to indicate the different planes. It will thus be seen that the roof or reinforcing ring forms at each post a solid structural angle with the pair of adjacent reinforcing sections converging at such post, the vertex of the angle being at the top of the post. The lines of intersection of the three planes forming the solid angle are indicated at 1, 2 and 3.

In some cases it may be desirable to provide a resilient or yielding connection intermediate the tank and the frame-work structure. For this purpose instead of the rigid bars or beams $m'$ resilient or yielding connecting members may be used and properly distributed around the tank.

It will be apparent that where I speak of "solid" or "spatial" angles, such terms are to be understood in a limited sense and in connection with the type of structure under consideration. The structural angles referred to are not, indeed, defined by continuous plates lying in three planes intersecting at approximately a point; but the structural elements (posts, trusses and braces) defining such skeleton structure are so arranged in three intersecting planes that they are capable of resisting stresses along each of such planes, so that the elements in each plane behave substantially like a continuous plate and in their totality produce the effect of a structural spatial angle.

Where in the claims I speak of a stiffening member the same is to be understood to include not only a horizontally extending ring, such as $h$, but also a roof structure inclined to the supporting posts and acting structurally similarly to such ring.

I claim:

1. A waterless gas-holder comprising, in combination, a cylindrical tank a movable closure disc therein, vertical reinforcing posts structurally united to such tank and extending externally thereof, trusses connecting adjacent posts and lying substantially in planes defined by such adjacent posts, and a stiffening member connected to said posts adjacent to the tops thereof and lying in a plane substantially at right angles to the aforementioned planes and forming skeleton spatial angles with said trusses at said posts.

2. A waterless gas-holder as set forth in claim 1 wherein said stiffening member is in the form of a ring composed of intersecting trusses.

3. A waterless gas-holder comprising, in combination, a cylindrical tank, a movable closure disc therein, vertical reinforcing posts positioned wholly externally of said tank, trusses connecting adjacent posts and lying substantially in planes defined by such adjacent posts, a stiffening member connected to said posts adjacent to the tops thereof and lying in a plane substantially at right angles to the aforementioned planes and forming skeleton spatial angles with said trusses at said posts, said trusses connecting the inner and outer edges of the posts, whereby skeleton four-sided reinforcing columns are provided by and between pairs of adjacent posts, said columns being of trapezoidal horizontal cross-section, and members connecting the tank to said posts, the reinforcing structure composed of said posts and trusses being capable of taking up the load due to wind pressure, gravity, and other external forces, while the shell of said tank is formed of thin, sheet metal incapable of resisting all of said external forces and capable of withstanding substantially only the internal gas pressure.

4. A waterless gas-holder comprising, in combination, a cylindrical tank, a movable closure disc therein, vertical reinforcing posts structurally united to such tank and extending externally thereof, trusses connecting adjacent posts and lying substantially in planes defined by such adjacent posts, and a stiffening member connected to said posts at the upper region of the posts, said stiffening member extending laterally of said posts in a plane substantially at right angles to the aforementioned planes and forming skeleton spatial angles with said trusses at said posts.

5. A waterless gas-holder as set forth in claim 1, including a roof structure attached to the upper ends of the posts, said stiffening member attached to said posts substantially at the points of connection of the roof structure therewith.

6. A waterless gas-holder comprising, in combination, a cylindrical tank, a movable closure disc therein, vertical reinforcing posts positioned wholly externally of said tank, trusses connecting adjacent posts and lying substantially in planes defined by such adjacent posts, a stiffening member connected to said posts at the upper region of the posts, said stiffening member extending laterally of said posts in a plane substantially at right angles to the aforementioned planes and forming skeleton spatial angles with said trusses at said posts, said trusses connecting the inner and outer edges only of alternate pairs of adjacent posts, whereby skeleton four-sided reinforcing columns are provided by and between such alternate pairs of adjacent posts, said columns being of trapezoidal horizontal cross-section, and members connecting the tank to said posts, the reinforcing structure composed of said posts and trusses being capable of taking up the load due to wind pressure, gravity, and other external forces, while the shell of said tank is formed of thin, sheet metal incapable of resisting all of said external forces and capable of withstanding substantially only the internal gas pressure.

KONRAD JAGSCHITZ.